Figure 4:
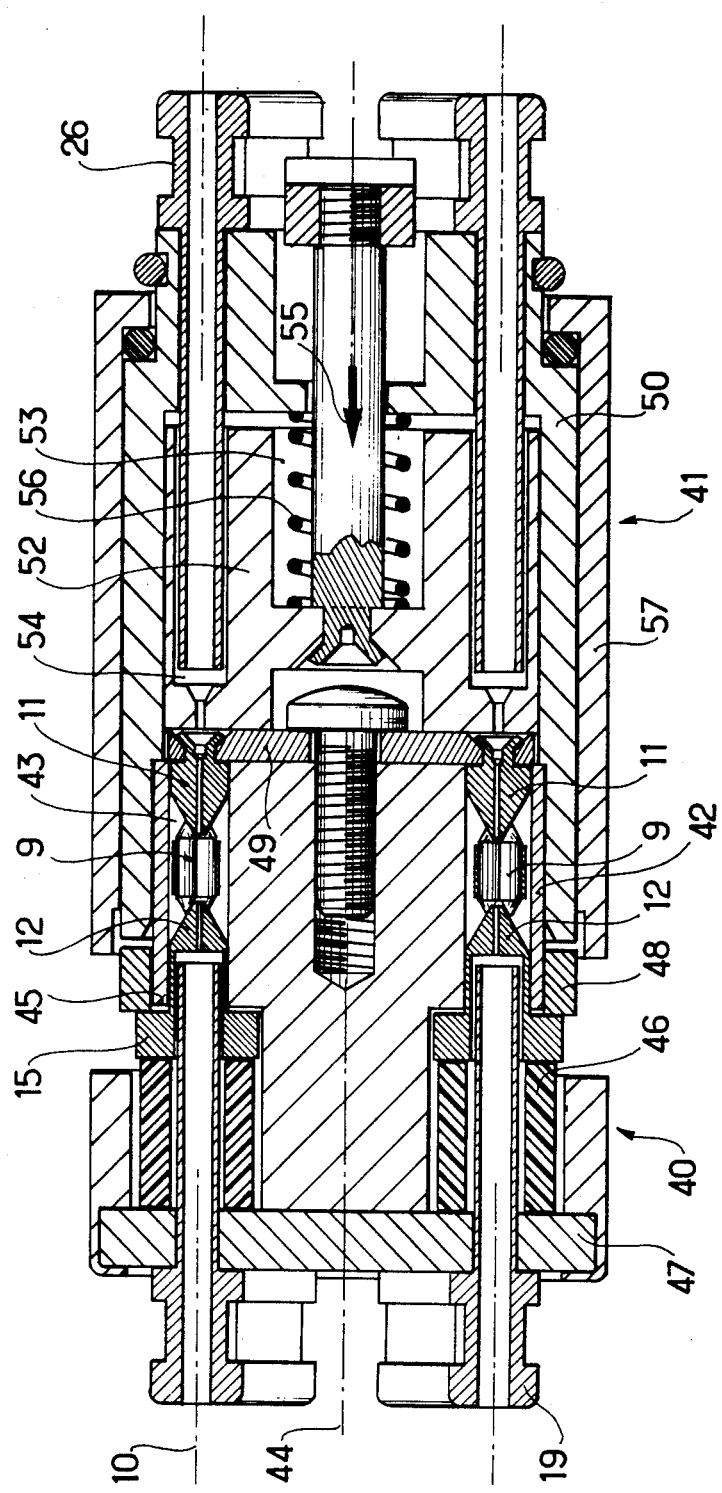

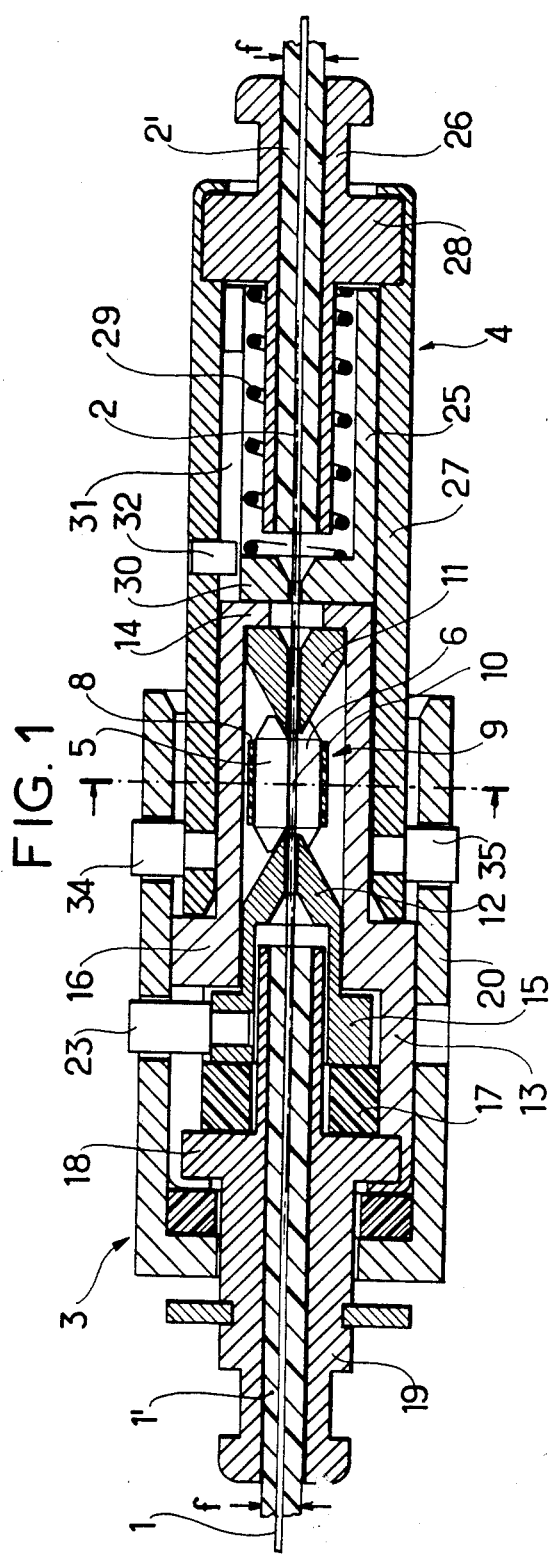
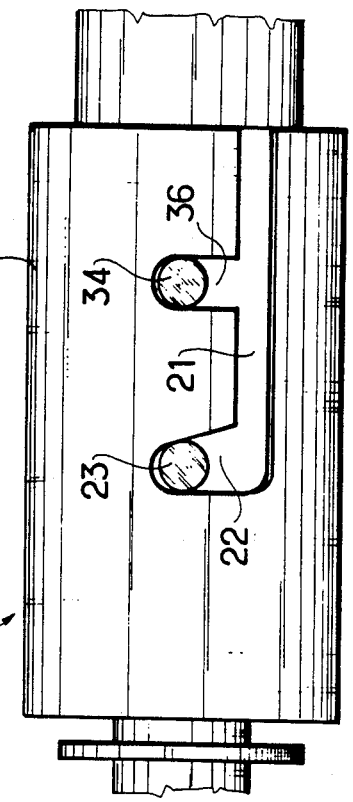
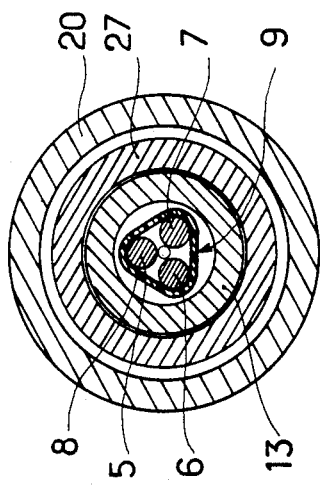

CONNECTOR FOR OPTICAL FIBRES

The invention relates to the technique of transmitting data by means of a light beam, which passes through glass fibres having a very small diameter.

A system for transmission by light beams comprises normally an emission light source (for example a light emitting diode or a laser diode) on one side, a photosensitive receiving element (for example a photodiode) on the other side and a wave guide more particularly made of glass fibres. Taking into consideration the small dimensions of a glass fibre guide (the core, for example, made of doped silica, of such a fibre can have a diameter of 75 $\mu$m and less and the coating, for example, of pure silica, can have a diameter of 125 $\mu$m), a very particular connecting technique is needed if the accuracy alignment requirements are to be satisfied, the stability of the mode of transmission decreasing and energy attenuation increasing rapidly with the errors in alignment. By way of example, it is required to limit the parallel shift between the axes of the two ends of the fibres to a value in the order of 3 $\mu$m, the angle between the two ends to about 1° and it is required to bring the two end faces less than 30 $\mu$m apart.

These requirements have led, up till now, to certain device. For example, a connector which comprises mainly a sheath which holds in position the two ends of the fibres to be connected together and whose refraction index is chosen to be identical to that of the coating of the fibre, has been described in Siemens Forschungsund Entwicklungsberichts Band 2, 1973, No. 4, pages 204, 205. By inserting between that sheath and the fibres a liquid whose refraction index is identical to that of the core of the fibres, a part of the energy lost at the level of the connection due to the mechanical inaccuracy of the connector is recovered and it is re-inserted in the fibres.

Another way of solving that problem has been described in the Archiv fur Elektronik und Obertragungstechnik 1972, vol. 26, p. 288 and 289. In that device, the two ends of the fibres are inserted in an alignment device comprising an eccentric disk and the position of the disk is adjusted by measuring the transmission parameters. Due to the small dimensions of the fibres to be aligned, such a device is very expensive to manufacture and the handling thereof is very delicate.

Another connection is described in Electronics Letters July 11, 1974, vol. 10, No. 14, p. 280–281. This device consists of an alignment body, containing a rectilinear groove and two cylindrical parts which are previously adjusted in a concentric manner respectively on the ends the fibres to be connected and which are aligned with each other in the said groove.

An object of the invention is to produce a connector for optical fibres which avoids the previous adjustment of elements on the ends of the fibres to be connected and/or the final adjustment of the connection and which can be disconnected and connected several times while being simple to handle.

The invention contemplates a connector for optical fibres, which comprises three rolls inside a flexible sheath in which the axes of the said rolls are parallel and equally spaced apart from each other, constituting a pressing assembly with a central axis which accomodates the ends of the fibres to be connected together along said central axis, first and second cones and a partly engaged in said pressing assembly at its respective ends and each equipped with a general duct for the free passage of a respective end of the fibres to be connected and means for actuating in a linear movement, along said central axis, at least one of the said cones for controlling the radial spacing apart and bringing closer together the said rolls in relation to the said central axis.

According to a feature of the invention, the second cone is mobile in a linear movement inside a tubular part between a first flexible stop and a second flexible stop which are inside the tubular part.

According to another feature, the means for actuating the cone in a linear movement is constituted by a stud carried by the second cone and extending readially towards the inside of the second cone, said stud being movable along a ramp formed in an outside part rotating about the axis of the pressing assembly.

Other features and advantages of the present invention will become apparent from the description of two embodiments illustrated in the accompanying drawing, in which:

FIG. 1 is an axial cross-section of an elementary connector according to the invention.

FIGS. 2 and 3 respectively show the connector in transverse cross-section, and a part of the connector top plan view.

FIG. 4 is an axial cross-section of a multi-connector according to the invention.

Figure 5:
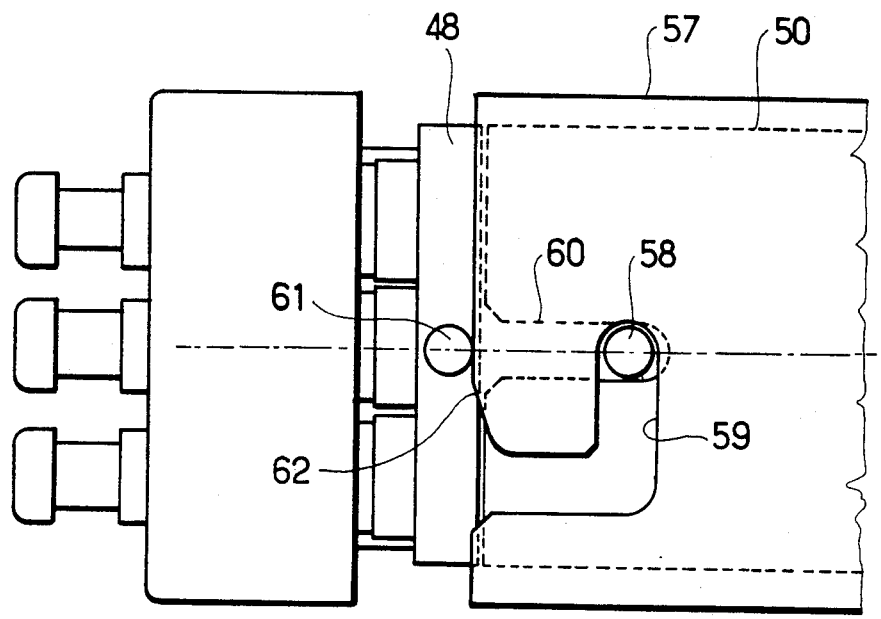
Figure 6:
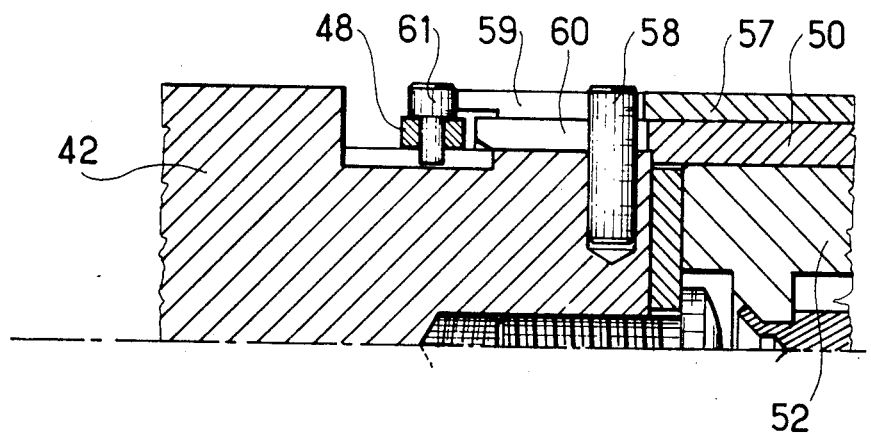

FIGS. 5 and 6 respectively show a part of the multi-connector according to FIG. 4, in axial cross-section and top plan view.

The connector in FIGS. 1 to 3 is intended to ensure the connecting of two fibres 1 and 2. The two fibres 1 and 2 are sheathed; the sheathes are designed by the reference numerals 1' and 2', only the ends of the two fibres 1 and 2 to be connected are bared. The connector is formed by two parts 3 and 4, in FIG. 1, the part 4 is shown fitted into the part 3.

The part 3 of the connector comprises three rolls 5, 6 and 7 whose axes are parallel and spaced equally apart from each other, those rolls are placed inside a sheath 8 made of a flexible material surrounding and compressing them. The assembly formed by the three rolls 5 to 7 and the flexible sheath 8 constitutes a pressing assembly 9 having a central axis 10. The assembly 9 is intended to accomodate, in the direction of its central axis 10, the bared ends of the fibres 1 and 2 to be connected together.

The ends of the rolls 5, 6 and 7 are conical. The conical ends of the rolls co-operate with two cones 11 and 12 partly engaged inside the pressing assembly 9. The two cones 11 and 12 have the same axis as that of the pressing assembly 9. They are provided with central ducts enabling the free passage of the bared ends of the two fibres 1 and 2 which are to be connected together, up to the center of the pressing assembly 9. These two cones 11 and 12 are intended to control the radial spacing of the three rolls 5, 6 and 7 in relation to the axis 10, being more or less inserted inside the assembly 9. The distance between the two cones 11 and 12 therefore defines the radial spacing of each of the rolls 5 to 7.

The diameter of the rolls 5, 6 and 7 is chosen as a function of the diameter of the fibres 1 and 2 to be connected together, so that those rolls press the two ends of the fibres in the direction of three generatrixes spaced at 120° in relation to one another. This is obtained by choosing rolls whose diameter is less than 6.5 times the diameter of the fibres. Of course, the diameter of the rolls must not become excessively small; indeed, this would increase the danger, of eccentric locking between two rolls only.

The pressing assembly 9 and the cones 11 and 12 are accomodated inside a tubular part 13 whose axis of revolution extends along the axis 10 of the assembly 9. In the tubular part 13, the cone 11 is stationary; it is kept in an abutting position against the front face 14 of part 13, said face nevertheless being drilled at its center for the free passage of the end of the fibre 2.

The cone 12 is slidably installed inside the tubular part 13. It has, for that purpose, a circular seat 15 inserted between a first transverse stop formed by a shoulder 16 on the wall of the tubular part 13 and a flexible washer 17, itself abutting against a shoulder 18 inside the part 13. A metallic sleeve 19 surrounding a sheathed part of the fibre 1, in the vicinity of the bared end of that fibre, has the aforementioned shoulder 18. The metallic sleeve 19 is made integral with the casting 1' for example by means of a synthetic resin, as diagrammatically shown in thick lines (FIG. 1). The tubular part 13 is made integral with the sleeve 19, by crimping onto the shoulder 18.

The pressure exerted by the flexible washer 17 is such that the latter pushes the sliding cone 12 inside the pressing assembly 9. The stationary cone 11 then sets up a reaction in the opposite direction and the three rolls are then held in the position spaced apart from each other and, with the sheath 8, abut against the inside wall of the tubular part 13.

The part 3 of the connector further comprises a ferrule 20 installed so as to rotate on the sleeve 19, while surrounding the tubular part 13. A first longitudinal slot 21 and a second slot 22 which is substantially helical and leading into the slot 21 are formed in ferrule 20, as clearly shown in FIG. 3. The sliding cone 12 carries a stud 23 extending radially outwards from the seat 15 of the cone 12 and co-operating with the slots 21 and 22 of the ferrule 20. The ferrule 20 rotates about the axis 10 of the pressing assembly 9. Such rotation is limited angularly by the length of the slot 22. The edge of the slot 22 constitutes an oblique ramp against which the stud 23 presses. The moving of the stud 23 in the slot 22 causes linear movement of the cone 12, in the direction of the axis 10, as will be seen hereinbelow.

The part 4 of the connector is intended for ensuring the guiding of the end of the fibre 2 with a view to the connection thereof with the fibre 1; it is, moreover, intended for ensuring the locking of the connector. The part 4 comprises a hollow cylinder 25, slidably installed on a metallic sleeve 26 surrounding a sheathed portion of the fibre 2, in the vicinity of its bared end. The hollow cylinder 25 slides inside a metallic casing 27 crimped on a shoulder 28 of the sleeve 26. A spring 29 is installed between the metallic sleeve 26 and the hollow cylinder 25; it abuts at one end against the shoulder 28 of sleeve 26 and at the other end against the front face 30 of the hollow cylinder 25. The spring 29 allows sliding of hollow cylinder 25 relative to the sleeve 26 inside the casing 27. A longitudinal groove 31 is provided in the hollow cylinder 25. A stud 32 carried by the casing 27 is inserted in the groove 31 and thus avoids any possible rotation of the hollow cylinder 25 during its movement along the sleeve 26. The length of the groove 31 limits travel of the hollow cylinder 25 on the sleeve 26. It will easily be understood that, although the parts 3 and 4 have been illustrated simply in the fitted together position, when the parts 3 and 4 are not fitted in, the force exerted by the spring 29 is such that the hollow cylinder 25 is pushed by the spring. The stud 32 is then in the abutting position at the bottom of the groove 31 and the end of the fibre 2 is substantially flush with the front face 30 of the hollow cylinder 25.

The metallic casing 27 further comprises two studs 34 and 35 protruding outside the casing 27. Those studs co-operate with the two longitudinal grooves such as 21, formed in the ferrule 20, during the fitting together of the two parts 3 and 4 on the cohnector, then with two grooves such as 36, which are substantially radial and lead into the grooves 21 when the ferrule 20 rotates. The connector is thus locked.

The connecting of the two fibres 1 and 2 is ensured, after previous treatment of the ends of the fibres 1 and 2 to be connected (for example by clean breakage):

Before the fitting together the parts 3 and 4 of the connector; the ends of the fibres are positioned in the respective parts 3 and 4. In the part 3, the end of the fibre 1 is positioned in the center of the pressing assembly 9 or connection plane, shown in FIG. 1 by the transverse cross-section plane. The rolls 5, 6 and 7 are then moved away from the axis 10 of the pressing assembly 9, under the action of the mobile cone 12 urged exclusively by the flexible washer 17, the stud 23 being placed simply at the bottom of the longitudinal groove 21 of the ferrule 20. In the part 4, the end of the fibre 2 is positioned with accuracy inside the casing 27, substantially flush with the outside surface of the front face of the hollow cylinder 25. The hollow cylinder 25 is then in the "advanced" position on the sleeve 26 under the action of the spring 29;

During the fitting of the part 4 into the part 3 of the connector (insertion of the casing 27 onto the tubular 13 and inside the ferrule 200), the front faces 14 and 30 of the tubular part 13 and of the hollow cylinder 25 bear against each other. The hollow cylinder 25 slides along the sleeve 26 against the force exerted by the spring 29. It then ensures the guiding of the end of the fibre 2 up to the center of the pressing assembly 9. When the fibre 2 is positioned in the center of the pressing assembly 9 and is therefore aligned with the fibre 1 and in contact with it, the front face of the casing 27 abuts against the shoulder 16 of the tubular part 13. The placing in the abutting position of the casing 27 against the shoulder 16 definies therefore with precision the position of the plane of connection in the center of the pressing assembly 9. The fibres 1 and 2 are correctly positioned in the parts 3 and 4 fitted together; they are held in position by outside means, exerting, for example, a force in the direction of the arrows $f$ on the sheaths 1' and 2';

After the fitting together of the parts 3 and 4 and the holding of the fibres in position, the connecting is effected by rotation of the ferrule 20. The stud 23 enters the slot 22 and moves along the oblique ramp thereof. Simultaneously, the studs 34 and 35 enter the slots 36. The stud 23, during its movement along the oblique ramp, compresses the flexible washer under the action of the cone 12 driven in a linear movement. The assembly formed by the rolls therofore closes and presses firmly against the ends of the fibres 1 and 2. The pressing assembly 9 thus ensures a constant pressure along three equidistant generatrixes on the two fibres 1 and 2 which are then strictly aligned. Simultaneously, the mechanical locking of the parts 3 and 4 of the connector is ensured by the studs 34 and 35 engaged in the slots 36.

FIG. 4 shows a multi-connector ensuring the simultaneous connecting of two cables each having six fibres, two of those six fibres being the only ones visible in FIG. 4. That multi-connector is equipped with six pressing devices, also designated by 9, identical to the device for pressing the connector described with reference to FIGS. 1 to 3. The principle of operation of the multi-connector being analogous to that of the aforementioned connector, only the particularities of the multi-connector will be described hereinbelow.

The two parts of the multi-connector are here designated by 40 and 41; they may be fitted to one another.

The part 40 comprises six pressing devices 9 each having three rolls inside a sheath as well as in the connector in FIGS. 1 to 3. The six pressing devices 9 are accomodated in six ducts 43 provided substantially at the periphery of a bored cylindrical part 42, so that their respective central axes 10 are distributed on the equidistant generatrixes of a cylinder of revolution, having as its axis the axis 44 of the connector. Each of the pressing assemblies 9 is affected by a cone also designated as 12, which can move linearly along its axis 10 and by a fixed cone designated as 11, setting up a reaction, the two cones 12 and 11 being inside a respective duct 43 of the part 42. Each of these ducts has an inside profile similar to that of the tubular part 13 in FIG. 1.

Each of the cones 12 which can undergo a linear movement has an annular seat, also designated as 15, installed between a circular stop 45 formed by the bore of the cylindrical part 42 and a flexible ring 46 itself abutting against the face of a flat cylindrical part 47. The flat cylindrical part 47 is drilled with openings in which are fixed respectively six metallic sleeves, also designated by 19, surrounding the six first sheathed casings. The flexible rings 46 exert on the respective mobile cones 12 a force such that the pressing assemblies 9 abut against the inside walls of the respective ducts 43.

An annular metallic part 48, installed around the bored cylindrical part 42, ensures a mechanical connection between the six mobile cones 12. The seats 15 of the cones 12 overlap at the annular part 48 and are pressed against it, the metallic annular part 48 and the flexible rings 46 being on either side of the respective seats 15. The part 41 of the multi-connector comprises, inside a bored cylindrical casing 50, six metallic sleeves, also designated as 26, surroundng six second sheathed fibres to be connected with the aforementioned six first fibres. These six sheathed sleeves 26 have their axes spaced in an equidistant manner along the generatrixes of a cylinder of revolution identical to the cylinder on which are spaced the axes of the six sleeves of the part 40. A part 52 equipped with a central duct 53 and with six ducts 54, in the vicinity of its periphery, is installed so as to slide on the six sleeves 26. Part 52 is urged towards the ends of the sleeves 26, in the direction of the arrow 55, by a spring 56 installed in the central duct 53. The part 52 protects the ends of the fibres which pass through it, as long as the parts 40 and 41 are not fitted together. It is urged towards the inside of the casing 50 against the force in the direction 55 of the spring 56 during the fitting together of the parts 40 and 41 of the multi-connector, by the abutting of its front face against the front face 49 of the part 40. It thus ensures the guiding of the ends of the six second fibres during their insertion in the pressing assemblies 9.

The part 41 of the multi-connector is surrounded by a ferrule 57 installed on the casing 50 and able to rotate about the axis 44 of the multi-connector. When the parts 40 and 41 are fitted together, the locking of the connector and the spacing apart of the mobile cones 12 are effected simultaneously by a rotating movement of the ferrule 57. The locking of the multi-connector and the linear movement of the mobile cones are explained with reference to FIGS. 5 and 6.

Actual locking is obtained by the engaging of two studs such as 58, carried by the cylindrical part 42, in two L-shaped slots 59, formed in the ferrule 57 and in two exclusively longitudinal slots 60 formed in the casing 50. During the rotating operation of the ferrule 57, the closure of the mobile cones 12 is effected, by means of the annular part 48, which is itself moved by two studs such as 61 which pass through it, each abutting against an oblique ramp 62 existing on the edge of the ferrule 57.

It must be understood that it is possible, without going beyond the scope of the invention, to employ one or several pressing devices 9, to adopt variants inasmuch as concerns the actuating of the pressing device or devices and the locking of the connector.

The performance of the connector according to the invention can also be improvided by wetting the front faces of the fibres to be connected together with a liquid whose refraction index is close to the index of the core of the fibre. In addition to the liquids known for that purpose, the applicant has observed that polyisobutylene can, to great advantage, be used for that purpose.

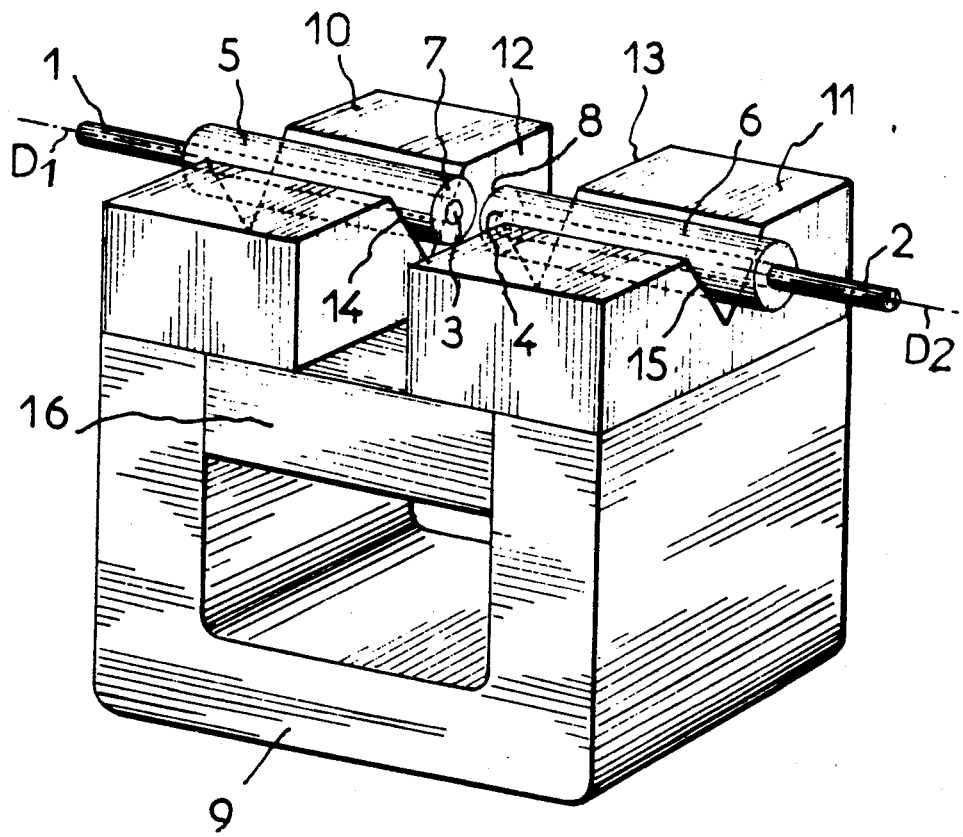

I claim:

1. A connector for optical fibers comprising a pressing assembly including three rollers and a flexible sheath surrounding said rollers and applying perssure thereto for pressing said rollers against a pair of optical fibers placed end to end in the interior of the rollers, said rollers extending parallel to one another in equally spaced relation to define a bore with a central longitudinal axis in which the optical fibers can be aligned and held in alignment, said rollers having tapered ends to form flared openings at the respective ends of the assembly of rollers, first and second cones disposed at the respective ends of the assembly of rollers and engaged in said flared openings, each cone having a central bore for the passage of a respective fiber therethrough and into the bore of the assembly of rollers, and means for relatively moving one of said cones with respect to the other in a longitudinal direction to selectively cause (a) the cones to advance into the flared openings and displace the rollers radially against the opposition of said flexible sheath whereby to enlarge the bore in the roller assembly and permit free insertion and removal of said optical fibers and (b) the cones to retract in the flared openings and permit the rollers to be displaced inwardly under the action of the flexible sheath to clamp the rollers against the optical fibers in the bore of the roller assembly.

2. A connector as claimed in claim 1 wherein said rollers are cylindrical and have a diameter less than 6.5 times the diameter of the fibers to be connected.

3. A connector as claimed in claim 1 comprising a tubular part receiving said cones and said pressing assembly, said tubular part having an axis coincident with said central axis, said first cone being secured in said tubular part, the second cone being longitudinally movable in said tubular part, and two stop means operatively associated with said second cone to limit the longitudinal movement thereof.

4. A connector as claimed in claim 3 comprising a seat on said second cone disposed between said two stop means, and a flexible washer disposed between the seat and one of the stop means for acting on the seat to urge the second cone into the associated flared opening in the roller assembly.

5. A connector as claimed in claim 4 wherein the means for relatively moving one of the cones with respect to the other comprises a stud on said second cone, a housing rotatable around said central longitudinal axis loosely receiving said second cone, said housing having a slot in which said stud is received, said slot having a surface inclined with respect to said central longitudinal axis and forming a ramp against which said stud bears such that rotation of said housing causes movement of said stud along said ramp and consequent linear movement of said second cone.

6. A connector as claimed in claim 5 further comprising means for guiding an end of one of the two fibres for the insertion thereof in said pressing assembly, the guiding means comprising a sleeve, a hollow cylinder linearly movable within said sleeve and surrounding a portion of said one fibre, in the vicinity of its end, said hollow cylinder having an end face provided with a central duct abutting against said tubular part for guiding the end of said one fibre into said pressing assembly during movement of said hollow cylinder along the said sleeve.

7. A connector as claimed in claim 4 comprising a plurality of said pressing assemblies equal in number to the number of pairs of fibres to be connected together, a casing for said pressing assembly, each pressing assembly being associated with a respective pair of said cones and with respective individual flexible washers, said first and second cones being urged inside the respective pressing assemblies under the action of said individual flexible washers, said means for relatively moving the cones comprising a single longitudinally movable member mechanically connecting said second cones, a stud engaging said member, and a rotatable member having a slot with an oblique ramp engaging said stud to move said longitudinally movable member upon rotation of said rotatable member.

8. A connector as claimed in claim 7 wherein said rollers are cylindrical and have a diameter less than 6.5 times the diameter of the fibres to be connected.

9. A connector as claimed in claim 1 comprising a liquid having a refraction index close to that of the core of the fibres between the connection faces of said fibers, said liquid being polyisobutylene.

* * * * *

United States Patent [19]
Pirolli

[11] 4,062,620
[45] Dec. 13, 1977

[54] DEVICE FOR CONNECTING OPTICAL FIBERS

[75] Inventor: Claude Pirolli, Rueil Malmaison, France

[73] Assignee: Telecommunications Radioelectriques et Telephoniques T.R.T., Paris, France

[21] Appl. No.: 665,953

[22] Filed: Mar. 11, 1976

[30] Foreign Application Priority Data

Mar. 25, 1975 France .................... 75.09289

[51] Int. Cl.$^2$ .................................. G02B 5/14
[52] U.S. Cl. .......................... 350/96 C; 350/96 R
[58] Field of Search .................. 350/96 C, 96 R; 228/44.1, 44.5, 49, 250

[56] References Cited
U.S. PATENT DOCUMENTS

| | | | |
|---|---|---|---|
| 3,112,360 | 11/1963 | Gregg | 350/96 R |
| 3,912,574 | 10/1975 | Cherin et al. | 350/96 C |

OTHER PUBLICATIONS

Leighton, "Fiber Optic Shutter," IBM Tech. Disc. Bulletin, vol. 11, No. 8, Jan. 1969, pp. 912–913.
Zemon et al., "Eccentric Coupler for Optical Fibers . . .," Appl. Optics, vol. 14, No. 4, Apr. 1975, pp. 815–816.

*Primary Examiner*—John K. Corbin
*Assistant Examiner*—Stewart Levy
*Attorney, Agent, or Firm*—Frank R. Trifari; Carl P. Steinhauser

[57] ABSTRACT

A device for connecting optical fibers, the ends of which are provided with cylindrical envelopes of magnetic material which envelop the ends of the fibers and which are rigidly connected thereto. The connection device comprises a magnet having pole-shoes provided with means for guiding the said envelopes in order to position the end faces of the fibers one opposite the other in the air gap formed by the pole-shoes.

7 Claims, 3 Drawing Figures